United States Patent
Bernard et al.

(10) Patent No.: US 12,288,907 B2
(45) Date of Patent: Apr. 29, 2025

(54) METHOD FOR TEMPERATURE CONTROL OF A SOLID OXIDE ELECTROCHEMICAL SYSTEM HAVING INTEGRATED HEATING MEANS

(71) Applicant: COMMISSARIAT A L'ENERGIE ATOMIQUE ET AUX ENERGIES ALTERNATIVES, Paris (FR)

(72) Inventors: Charlotte Bernard, Grenoble (FR); Jérôme Aicart, Grenoble (FR); Julie Mougin, Grenoble (FR); Géraldine Palcoux, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 307 days.

(21) Appl. No.: 17/288,090

(22) PCT Filed: Oct. 23, 2019

(86) PCT No.: PCT/FR2019/052533
§ 371 (c)(1),
(2) Date: Apr. 23, 2021

(87) PCT Pub. No.: WO2020/084257
PCT Pub. Date: Apr. 30, 2020

(65) Prior Publication Data
US 2021/0376351 A1    Dec. 2, 2021

(30) Foreign Application Priority Data
Oct. 26, 2018 (FR) .................................. 18 59931

(51) Int. Cl.
*H01M 8/2428* (2016.01)
*H01M 8/04007* (2016.01)
(Continued)

(52) U.S. Cl.
CPC ... *H01M 8/04708* (2013.01); *H01M 8/04037* (2013.01); *H01M 8/04067* (2013.01);
(Continued)

(58) Field of Classification Search
None
See application file for complete search history.

(56) References Cited

U.S. PATENT DOCUMENTS

| 3,623,913 | A | 11/1971 | Adlhart et al. | |
| 5,942,344 | A * | 8/1999 | Lehmeier | H01M 8/04067 429/442 |
| 9,803,290 | B2 | 10/2017 | Bertier | |
| 2005/0112436 | A1* | 5/2005 | Jeffcoate | H01M 8/04007 429/495 |

(Continued)

FOREIGN PATENT DOCUMENTS

| EP | 1271684 A2 * | 1/2003 | ........ H01M 8/0204 |
| EP | 2 980 904 A1 | 2/2016 | |

(Continued)

OTHER PUBLICATIONS

International Search Report issued Mar. 6, 2020 in PCT/FR2019/052533 filed Oct. 23, 2019, 2 pages.
(Continued)

*Primary Examiner* — Lucas J. O'Donnell
(74) *Attorney, Agent, or Firm* — Oblon, McClelland, Maier & Neustadt, L.L.P.

(57) ABSTRACT

Disclosed is a method for the temperature control of an electrochemical system comprising a stack of electrochemical cells and interconnection plates interposed between the electrochemical cells, means for supplying gas to the electrochemical cells and means for collecting gases produced by the electrochemical cells, and means for electrically connecting the system to the outside, wherein the electrochemical device also comprises heating means integrated into the stack, said heating means comprising at least a first and a second heating element, the first heating element being (Continued)

disposed in a first location in the stack and the second heating element being arranged in a second location in the stack, said method comprising steps of: applying a first control command to the first heating element and a second control command to the second heating element, said control commands being configured such that a thermal gradient in the stack in the direction of the stack is maintained substantially at a defined value.

21 Claims, 6 Drawing Sheets

(51) Int. Cl.
*H01M 8/04701* (2016.01)
*H01M 8/248* (2016.01)
*H01M 8/12* (2016.01)

(52) U.S. Cl.
CPC ......... *H01M 8/2428* (2016.02); *H01M 8/248* (2013.01); *H01M 2008/1293* (2013.01)

(56) References Cited

U.S. PATENT DOCUMENTS

| | | | |
|---|---|---|---|
| 2007/0134521 A1* | 6/2007 | Thanner | H01M 8/04037 429/495 |
| 2008/0318101 A1* | 12/2008 | Kim | H01M 8/04641 429/422 |
| 2015/0368818 A1* | 12/2015 | Pedersen | C25B 9/00 204/267 |
| 2016/0056492 A1 | 2/2016 | Tsuga et al. | |
| 2019/0013539 A1 | 1/2019 | Reytier et al. | |

FOREIGN PATENT DOCUMENTS

| | | |
|---|---|---|
| FR | 2 985 522 A1 | 7/2013 |
| FR | 3 045 215 A1 | 6/2017 |
| WO | WO 2017/102657 A1 | 6/2017 |

OTHER PUBLICATIONS

Preliminary French Search Report issued Jul. 30, 2019 in French Patent Application No. 1859931 filed Oct. 26, 2018 2 pages (with Translation of Category).

* cited by examiner

METHOD FOR TEMPERATURE CONTROL OF A SOLID OXIDE ELECTROCHEMICAL SYSTEM HAVING INTEGRATED HEATING MEANS

TECHNICAL FIELD AND PRIOR ART

The present invention relates to a method for the temperature control of an electrochemical system including at least one electrochemical device comprising a stack of electrochemical cells, for example of the solid oxide type operating at high temperature, and heating means integrated in the stack.

The electrochemical device can be used for high-temperature electrolysis and can include a stack of solid-oxide electrolyser cells (SOECs) or as a fuel cell and include a stack of solid-oxide fuel cells or SOFCs.

Such a device includes a stack of electrochemical cells gripped between two clamping plates.

Each cell includes an electrolyte between two electrodes. Interconnection plates are interposed between the cells and provide the electrical connection between the cells. Furthermore, the interconnection plates provide the gas supply to the cells and the collection of the gases produced at each cell.

In operation, the anode and the cathode are the site of electrochemical reactions, while the electrolyte enables ions to be transported from the cathode to the anode, or vice versa depending on whether the electrochemical device is operating in electrolyser mode or in fuel cell mode.

Thus, in electrolyser mode, the cathode compartment allows an addition of water vapour and a discharge of the water-reduction products, in particular hydrogen, while the anode compartment, via a draining gas, provides discharge of the dioxygen produced by the oxidation of the $O^{2-}$ ions migrating from the cathode to the anode.

The mechanism of electrolysis ("SOEC" mode) of the water vapour by an elementary electrochemical cell is described below. During this electrolysis, the elementary electrochemical cell is supplied by a current flowing from the cathode to the anode. The water vapour distributed by the cathode compartment is then reduced under the effect of the current in accordance with the following half-reaction:

$$2\ H_2O + 4\ e^- \rightarrow 2\ H_2 + 2\ O^{2-}.$$

The dihydrogen produced during this reaction is then discharged, while the $O^{2-}$ ions produced during this reduction migrate from the cathode to the anode, via the electrolyte, where they are oxidised into dioxygen in accordance with the half-reaction:

$$2\ O^{2-} \rightarrow O_2 + 4\ e^-.$$

As for the dioxygen thus formed, this is discharged by the draining gas circulating in the anode compartment.

The electrolysis of the water vapour corresponds to the following reaction:

$$2\ H_2O \rightarrow 2\ H_2 + O_2.$$

In fuel cell mode ("SOFC"), air is injected into the cathode compartment and dissociates into $O^{2-}$ ions. The latter migrate towards the anode and react with dihydrogen circulating in the anode compartment in order to form water.

Operating in fuel cell mode allows the production of an electric current.

The clamping plates exert a clamping force on the stack in order to ensure good electrical contact between the interconnection plates and the cells and impermeability of the stack.

The operating temperatures of SOEC/SOFC systems are generally between 600° C. and 1000° C.

These temperatures are obtained by disposing the stack in a high-power oven. The oven includes an enclosure and for example electric elements on the internal faces of the walls of the enclosure. It therefore has a certain bulk. The heat transfer between the electric elements and the stack takes place by convection or by radiation. Instrumentation is provided in the space delimited between the oven and the device in order to monitor and regulate the temperature.

The system for producing hydrogen or for producing electricity therefore includes an oven and the electrochemical device.

Heating in an oven does not make it possible to finely regulate the temperature of the stack and also does not make it possible to take account of differences in performance in the operation of electrochemical cells.

Furthermore, gas flushing is implemented in the oven for reasons of safety, which interferes with the transfer by convection. Moreover, heat transfer by radiation is dependent on the dimensions of the enclosure, the larger an enclosure the more the heat transfer by radiation is impacted thereby.

The document WO 2017/102657 describes an example of an electrochemical device including a stack of solid-oxide cells held by a clamping system of the "plug and play" type, that is to say easily connectable to the gas supply and collection surfaces. The clamping system is designed to provide a substantially constant clamping level despite variations in temperature. The electrochemical device is disposed in an oven.

DESCRIPTION OF THE INVENTION

Consequently, one aim of the present invention is to offer a method for regulating an electrochemical system including a stack of electrochemical cells and allowing optimised regulation of the temperature of the stack.

The aim stated above is achieved by a method for regulating a system including an electrochemical device comprising a stack of electrochemical cells and of interconnection plates interposed between the cells, and heating means integrated in the stack, the heating means including at least two heating elements each disposed at a distinct location in the stack. The regulation method controls each heating element separately. For example, at least one of the heating elements delivers more or less heat than the other heating elements in order to compensate for the reduced operating performance of one or more cells, or to compensate for thermal leakages. According to another example, at least one of the heating elements can be controlled so that it supplies more heat to heat the gases supplying the cells. According to the invention, the thermal gradient is controlled through the stack.

This regulation method makes it possible to more easily achieve a homogeneous temperature of the stack, which optimises the operation of the whole of the system.

In other words, it is possible to achieve a local thermal regulation within the stack by separately managing the heating elements distributed in the stack. It is then possible to adapt the additions of heat at the various points in the stack according to requirements.

The heating elements are advantageously electrical, for example including electrical cables or leads. The differentiated regulation of the heating elements can then be obtained by managing the intensity of the electric currents supplying each cable.

One subject-matter of the present invention is then a method for thermal regulation of an electrochemical system comprising a stack of n electrochemical cells, n being an integer greater than or equal to 1, and at least n−1 interconnection plates interposed between the electrochemical cells, means for supplying gas to the electrochemical cells and means for collecting gases produced by the electrochemical cells, and means for electrical connection of the system to the outside. The electrochemical device also includes heating means integrated in the stack, said heating means including at least a first and a second heating element, the first heating element being disposed in a first location in the stack and the second heating element being disposed in a second location in the stack, including:

applying a first command to the first heating element and a second command to the second heating element, said first and second commands being determined so as to maintain a thermal gradient in the stack in the direction of the stack substantially at a given value.

Preferably, the first and second commands vary during the operation of the system. The given value forming an instruction may vary in the course of the operation.

For example, in the case where the first location is situated at an end of the stack through which the pipes supplying gas to the cells enter, the gas being at a temperature at the operating temperature of the system, the first command may be such that the first element generates a quantity of heat sufficient for compensating for the drop in temperature due to the supply of gas and to maintain the thermal gradient substantially at the given value.

Preferably, determining the first command takes into account the temperature or temperatures of the feed gases and/or the flow rates thereof.

In an advantageous embodiment, at least in a start-up phase of the system, the first and second commands are such that the first and second heating elements are at the same temperature, until the system reaches its operating temperature.

According to an additional feature, the first and/or the second command is or are determined and/or modified according to a measurement of operating characteristics of the system.

The regulation method may include:

the step of measuring the temperatures in at least two separate regions of the stack, the step of comparing the difference in the temperatures of two regions with respect to a given value, the step of determining or modifying the first and/or the second command in light of the comparison step.

Another object of the present invention is an electrochemical system including at least one electrochemical device comprising a stack of n solid-oxide electrochemical cells, n being an integer greater than or equal to 1, and at least n−1 interconnection plates interposed between the electrochemical cells, means for supplying gas to the electrochemical cells and means for collecting gases produced by the electrochemical cells, and means for electrical connection of the system to the outside. The electrochemical device also includes heating means integrated in the stack, said heating means including at least a first and a second heating element, the first heating element being disposed in a first location in the stack and the second heating element being disposed in a second location in the stack, said system also including control means configured for separately controlling the first heating element and the second heating element so as to afford a different addition of heat between the first location and the second location.

For example, the n electrochemical cells are solid-oxide electrochemical cells.

Advantageously, the heating elements are Joule effect elements.

The control means can control the heating elements according to a mode predetermined at the design of the electrochemical system.

The electrochemical system advantageously includes means for measuring the temperature in at least first and second distinct regions of the stack. The control means control the heating elements so as to reduce the thermal gradient in the direction of the stack.

The first and second heating elements are for example each disposed in a plate, referred to as a heating plate, disposed in the stack or on the stack. Advantageously the heating plates are each disposed at an end of the stack in the direction of the stack.

The system may include two clamping plates each disposed at an end of the stack in the direction of the stack and means cooperating with the plates in order to apply a clamping force to the n cells and n−1 interconnections.

In an example embodiment, each heating plate is formed by a clamping plate.

In another example embodiment, each heating plate is in abutment against a clamping plate, advantageously against the external face thereof.

The electrochemical system may advantageously include a thermally insulating enclosure defining an internal space receiving the electrochemical device and insulating it thermally from the outside.

BRIEF DESCRIPTION OF THE DRAWINGS

The present invention will be understood better on the basis of the following description and the accompanying drawings, on which.

DETAILED DESCRIPTION OF PARTICULAR EMBODIMENTS

The following description describes in detail examples of electrochemical systems that can be controlled by a thermal regulation method according to the invention, but the invention can apply to other electrochemical systems, as will be explained hereinafter.

Figure 1:
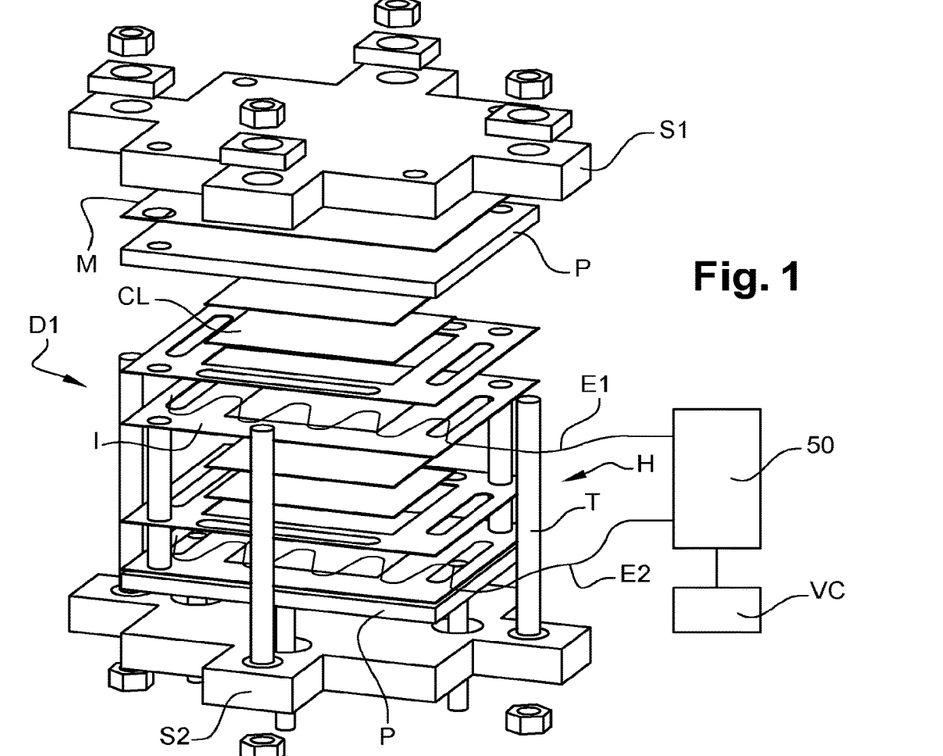
FIG. 1 is an exploded view of the electrochemical system that can be controlled by a thermal regulation method according to the invention.

In FIG. 1, an exploded view of an example embodiment of an electrochemical system can be seen, which can be controlled by a thermal regulation method according to the invention.

The electrochemical system includes an electrochemical device D1 intended to be used for high-temperature electrolysis ("SOEC" mode) or as a fuel cell ("SOFC" mode).

The electrochemical device D1 comprises a stack of solid-oxide electrochemical cells.

The stack comprises a plurality of elementary electrochemical cells CL each formed by a cathode, an anode and an electrolyte disposed between the anode and the cathode. The electrolyte is made from strong and dense ion-conductive material, and the anode and the cathode are porous layers.

The stack further includes interconnection plates or interconnectors I, each interposed between two successive elementary cells and providing the electrical connection between an anode of an element cell and a cathode of the adjacent element cell. The interconnectors I provide a connection in series of the elementary cells.

A stack may include between one cell and several hundreds of cells, preferably between 25 cells and 75 cells.

The intermediate interconnectors also delimit fluid compartments at the surface of the electrodes with which they are in contact.

The face of an intermediate interconnector I in contact with an anode of an elementary electrochemical cell CL delimits a compartment, referred to as an anode compartment, and the face of an interconnector I in contact with a cathode of an elementary electrochemical cell CL delimits a compartment referred to as a cathode compartment.

Each of the anode and cathode compartments allows the distribution and collection of said gases.

For example, for electrolysis of water, the cathode compartment provides a supply of water vapour to the cathode and discharge of the hydrogen produced. The anode compartment provides the circulation of a draining gas and the discharge of the oxygen produced at the anode.

The electrochemical device may include end plates P disposed on either side of the stack. The end plates are electrically conductive.

The device also includes tubes (not shown) for distributing the gases and tubes for collecting the gases.

In the example shown, the electrochemical device D1 also comprises a clamping system S1, S2 provided with two clamping plates, referred to respectively as first clamping plate or top clamping plate S1 and second clamping plate or bottom clamping plate S2 disposed on either side of the stack in the direction of the stack and intended to exert a clamping force on the stack by means of tie rods T.

According to this configuration, each end plate P is electrically insulated from the clamping plate that is adjacent thereto, by interposing an electrical insulation plate M, for example made from mica, between each clamping plate and each end plate.

The tie rods T are for example formed by clamping rods passing through the clamping plates and on the ends of which nuts are mounted. These means are, in this regard, described in the document FR 3 045 215.

Advantageously, the clamping plates S1, S2 may be produced from stainless steel, highly advantageously from refractory austenitic steel, for example of the AISI 310S type, having a thermal expansion coefficient of $18.5 \times 10^{-6}$ between 20° C. and 800° C. Furthermore, this steel offers good mechanical strength up to 1000° C.

The tie rods are for example made from nickel-based superalloy of the Inconel 625 type.

Combining these materials compensates for the difference in expansion between the clamping rods and the electrochemical cells through the high expansion of the clamping plates. Advantageously, washers, in the same material as the clamping plates, are interposed between the clamping plates and the nuts.

One or other or both of the clamping plates S1, S2 is or are provided with at least one pipe for the flow of gases that enables gases to flow from a gas inlet to a gas outlet in order to supply gases to or discharge gases from the solid-oxide stack.

The gas inlet and outlet are disposed respectively on each of the faces with the largest surface area of the clamping plate S1, S2.

The electrochemical device also includes heating means H integrated in the stack. In FIG. 1, these means H are shown schematically.

In the present document, "integrated heating means" means heating means in direct mechanical contact with the stack. They are disposed on and/or in the stack. The heating means are mounted in already existing elements of the stack or in elements added to the stack.

In this example, the heating means H1 are electrical heating means by Joule effect. They include at least two heating elements E1, E2 integrated at at least two separate locations in the height of the stack.

For example, the heating elements E1, E2 are electrically conductive cables or leads 2 integrated in the stack and which generate heat by dissipation. In the remainder of the description, "cable", "electrical cable" or "heating cable" will be used to designate electrically conductive cables forming the heating means. For example, the heating means include a heating core with mineral insulator, magnesia MgO (96-99%), in an Inconel 600 sheath and with integrated cold terminations. The heating core has for example a diameter of 2.0 mm+/−0.05 mm over a length of 6.5 m+/−5%, having an internal resistance of 7.0 ohms/m+/−10%.

Preferably, the heating elements E1, E2 are positioned in the stack so as to allow facilitated control of the temperature or temperatures throughout the stack. Preferably, they are disposed at the ends of the stack in the direction of the stack, which makes it possible to control the thermal gradient over the entire height of the stack.

Each heating element is connected to an electrical supply source 50 so as to be able to be controlled independently of the other cable, and thus allow a differentiated provision of heat by each heating element. For example, it can be envisaged that the two heating elements be connected to the same power supply source and that the means for modulating the current be provided at each heating element. In a variant, each heating element is connected to its own electrical supply source, which is regulated.

The heating means are controlled by a control unit VC, for example a computer, for example on the basis of measurements supplied by the thermocouples, the set temperature value or values and/or predetermined operating modes, as will be described below.

Figure 2:
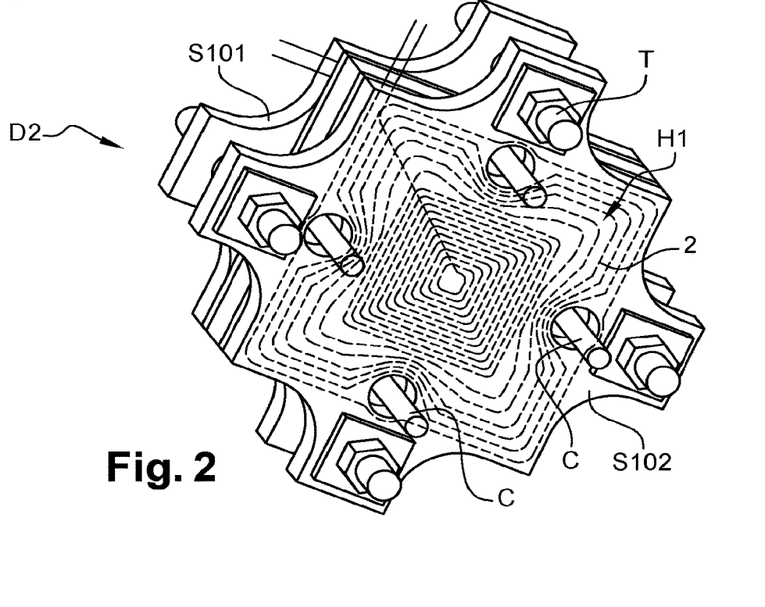
FIG. 2 is a perspective view of an electrochemical system according to an example embodiment, which can be controlled by a thermal regulation method according to the invention.
Figure 3A:
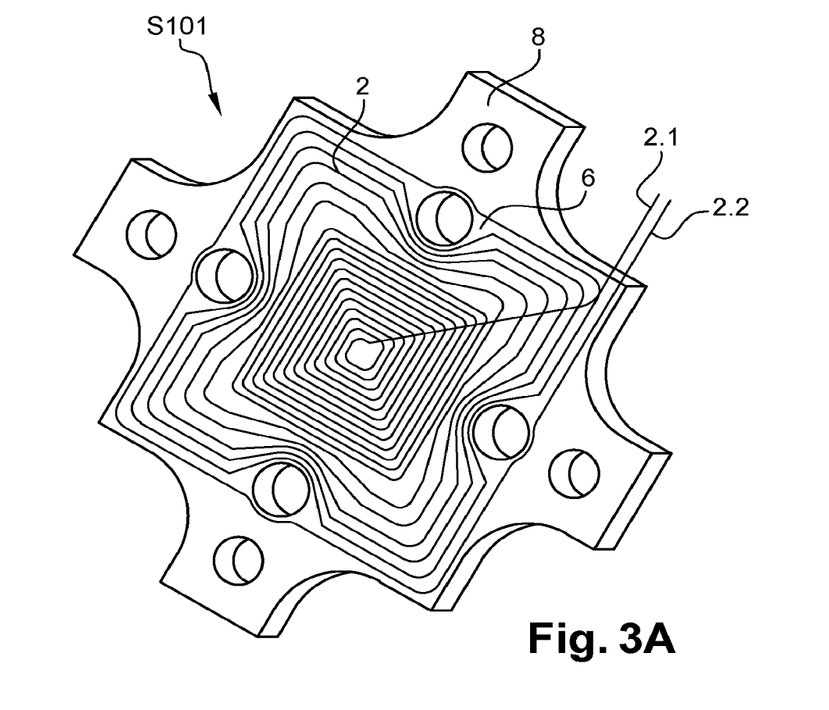
FIG. 3A is a perspective view of a clamping plate used in the system in FIG. 2, shown alone.
Figure 3B:
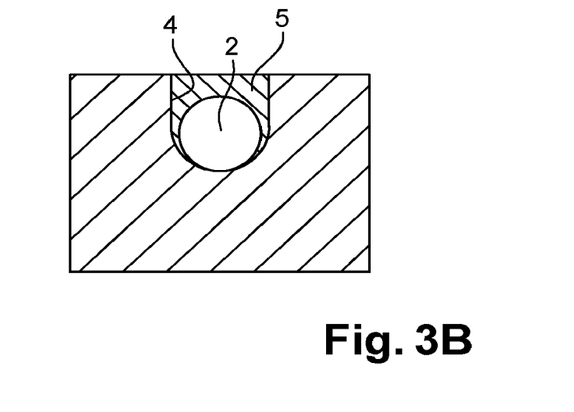
FIG. 3B is a detail view of a cross section of the clamping plate of FIG. 3A at an electrical conductor.

FIGS. 2, 3A and 3B show an advantageous practical example embodiment of an electrochemical system including an electrochemical device D2. In this example, the heating means H1 are present in the two clamping plates S101, S102.

The clamping plates are produced from a material able to conduct heat in the direction of the stack. Preferably, the material has good thermal conductivity, preferably at least equal to 10 W/m·K. AISI 310S steel advantageously has good thermal conductivity, 15 W/m·K at 20° C. and 19 W/m·K at 500° C.

In this example and as shown in FIG. 3B, a recess 4 is formed in one of the faces with the largest surface area of a clamping plate S101, the depth of which is sufficient to receive the electrical cable 2. Preferably, the depth of the recess 4 is sufficient for the cable 2 not to project from the plate. The cable is immobilised in the recess 4 by adding a material, for example solder 5, for example implemented under vacuum. Preferably, the material of the solder is the same as that of the clamping plate in order to avoid risks of differential expansion.

Preferably, the solder is disposed on the side of the stack. Thus the heating zone is situated as close as possible to the stack.

In this example the conductor is disposed in the form of a square spiral.

Highly advantageously, the electrical cable is distributed over a surface corresponding to the surface of the electrochemical cells in order to optimise the heating of the device. In the example shown, the heating plate S101 includes a square-shaped main part 6 and arms 8 projecting on each side of the main part for the tie rods to pass. The electrical cable extends over the entire surface of the main part almost as far as the edges thereof. In this example, the electrical cable is distributed uniformly over the surface, providing a uniform distribution of heating over the entire surface of the stack.

The connection ends 2.1, 2.2 of the cable emerge laterally from the clamping plate in order to connect electrically to the rest of the system.

Figure 4A:
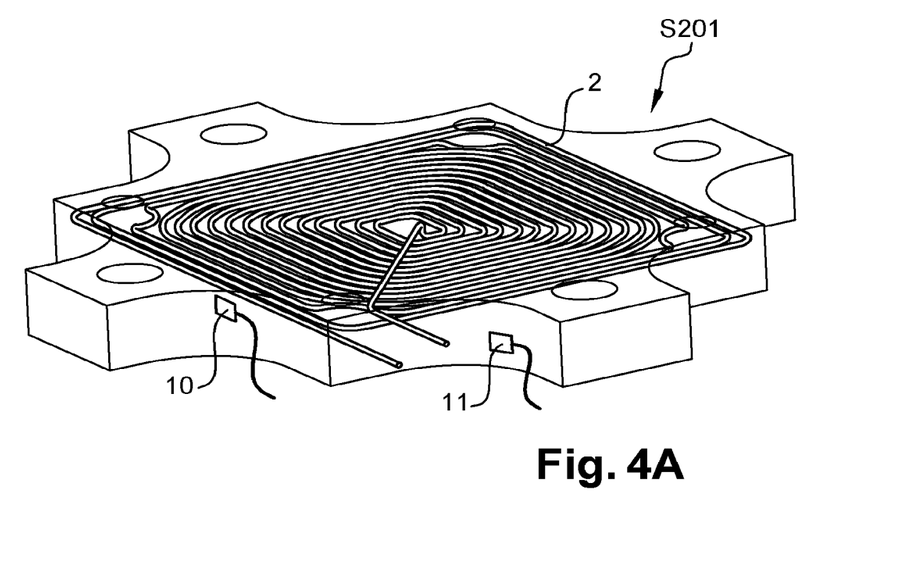
FIGS. 4A and 4B are perspective views of a clamping plate according to a variant embodiment that can be used in the system of FIG. 2.
Figure 4B:
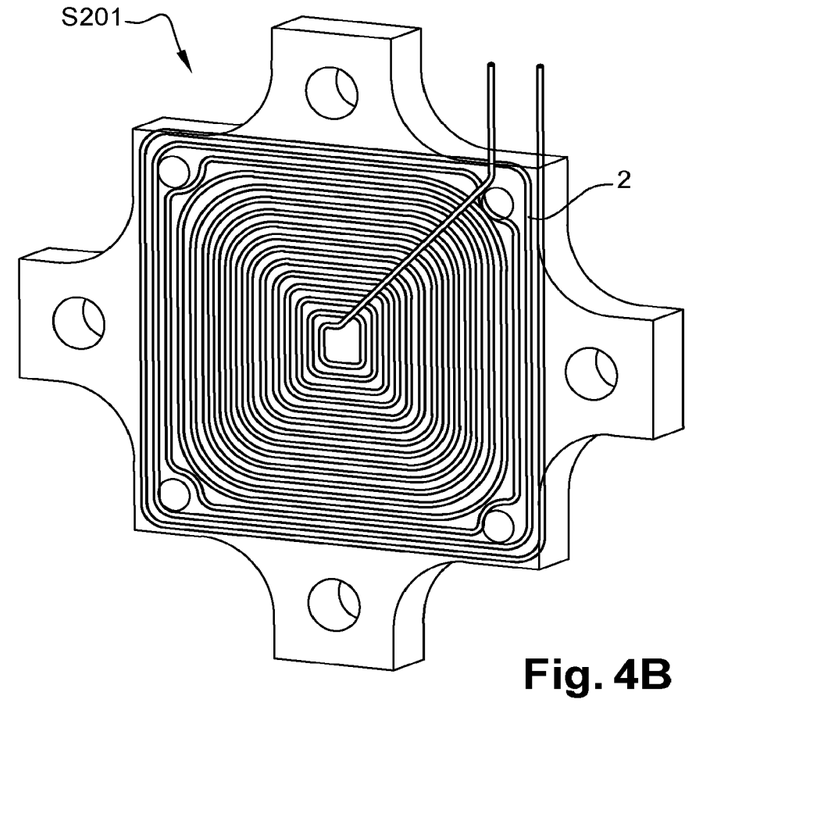

In FIGS. 4A and 4B, a variant embodiment of a clamping plate S201 can be seen, wherein the electrical cable 2 has another distribution.

Any other distribution of the electrical cable can be envisaged.

In endothermic operation, a high loss of heat appears at the core of the stack. Preferably, the plate has a high density of electrical conductor at the centre of the plate to provide a higher amount of heat at the centre of the plate relative to the edges thereof.

The recess is for example produced by machining.

By way of example, the clamping plates have dimensions in the plane for example of a few hundreds of mm, for example 200 mm×200 mm, and a thickness of one to several tens of mm, for example 10 mm.

In the examples shown, a single electrical cable per plate is used, which simplifies the connection to the current source. Nevertheless, it can be envisaged putting a plurality of cables per plate distributed in one plane or in a plurality of planes. The use of a plurality of cables has the advantage, in the case where a cable is defective, of making it possible to continue to supply heat to the stack, all the more so since in general it is not possible to remove the clamping plates, the load applied by these via the tie rods not being able to be removed without making the device inoperative.

Advantageously, one or more temperature sensors 10, 11, for example thermocouples shown in FIG. 4B, are disposed in each clamping plate. Two temperature sensors are preferably used, one safety temperature sensor 10 disposed as close as possible to the heating cable in order to monitor the temperature of the cable, and to avoid overheating and degradation thereof, and one temperature sensor 11 intended for regulation and disposed so as to measure the temperature of the plate, the regulation sensor is disposed further away from the heating cable, for example at a few millimetres.

Integrating heating means as close as possible to the cells makes it possible to control the energy that is actually supplied to the stack. Furthermore, there are no longer any heat losses by radiation between the oven and the device. Heating is therefore more effective.

Furthermore, in the particular example in FIG. 2, integrating the cable or cables in the clamping plate makes it possible not to modify the overall size of the electrochemical device and therefore to enable it to replace devices already in place.

However, despite the greater efficacy in the heating of the stack obtained by integrating the heating means, a thermal gradient may appear in the stack, which may be detrimental to the correct operation of the system.

According to the invention, each heating element integrated in the clamping plates may be controlled separately so as to allow a given addition of heat according for example to the location of the heating element in the stack and/or the operating mode selected and/or the operating characteristics of the electrochemical system.

Thus the system may be controlled so that the quantity of heat supplied by the heating element in the clamping plate S101 is different from, or identical to, the quantity of heat supplied by the heating element in the clamping plate S102.

For example, when the system is started up, the two heating elements are controlled so as to provide the same quantity of heat in order to have a homogeneous temperature over the entire height of the stack and to eliminate the thermal gradient between the two end plates. This operating mode can be maintained until the stack reaches the operating temperature.

According to another example, the two heating elements are controlled so as to provide different quantities of heat and to establish a temperature gradient within the stack in order to compensate for a temperature gradient that appeared during the operation of the cells.

The maximum temperature gradient is around several tens of degrees, for example 50° C., or even 100° C.

For example, if one or more of the cells in the stack have reduced performance compared with other cells, the temperature at this or these cells may be different from the temperature at the more efficient cells, the heating element or elements at the less efficient cell or cells is or are controlled so as to compensate for the different in temperature, and to make it possible to achieve a homogeneous temperature throughout the stack.

The provision of different quantities of heat by the heating elements may also be controlled when a portion of the stack suffers a greater heat loss than another.

Moreover, the system includes pipes C for supplying gas to the electrochemical cells. However, the gases entering the system are generally at a temperature lower than the operating temperature of the system, for example around 500° C. The pipes in general enter the stack at one end thereof, and the input of the gases then tends to create a temperature gradient within the stack. The regulation method according to the invention makes it possible to counter the appearance of this thermal gradient by controlling the heating element situated closest to the input of feed gases in order to heat the latter before they enter the stack.

In FIG. 2, the pipes C pass through the clamping plate S102. The heating element E1 disposed in this clamping plate is controlled so as to generate more heat than the heating element in the clamping plate S101, in order to compensate for the thermal well formed by the feed gases.

The differentiated management of the heating elements makes it possible to homogenise the temperature of the stack more finely and thus firstly to optimise the efficiency of the system by homogenisation of the performances of the cells, and secondly to preserve the stack from the mechanical stresses caused by the thermal gradients.

The differentiated management furthermore makes it possible to take into account the exothermal character of certain operating modes in the control of the heating elements. In these operating modes a temperature gradient appears in the stack, which can advantageously be compensated for by controlling the heating elements in a suitable manner.

Furthermore, it has been found that, within the stack itself, zones may have an endothermic operation and others could have an exothermic operation, for example the upper end of the stack may have an exothermic operation and the lower end of the stack may have an endothermic operation. By controlling each heating element separately, it is possible to adapt the thermal supply to the local requirement of the stack.

The method for regulating each of the heating elements can be pre-established by experiment and/or by simulation so as to maximise the efficiencies of the system while preserving the integrity of the stack. For example, the command for the heating element to heat the feed gases may be established when the system is designed, the flow rate and the temperature of the feed gases being substantially constant. The control unit may then be programmed to control the heating element so that it systematically generates a given quantity of heat greater than the other heating element.

In another example, the regulation mode may take account of real-time measurements of operating characteristics of the stack during the operation thereof and generate instructions to the heating elements on this basis.

For example, measurements of temperature in the stack make it possible to detect the existence of a thermal gradient. The heating elements are then controlled so as to compensate for this thermal gradient. Other characteristics of the system may be taken into account for controlling the heating elements. For example, these may be current/voltage characteristics of one, several or all the cells in the stack. Temperature measurement means are then integrated in the stack.

To heat the gases, provision may be made for linking the command to the flow rate of the feed gases and/or the inlet temperature thereof.

Thus the provision of heat at various points on the stack can be adjusted during the operation of the system in a pre-established manner and/or continuously. It is possible to envisage a management applying, initially, a pre-established mode, for example in order to reach the operating temperature, and secondly an adjustable mode according to the characteristics measured.

Furthermore, the regulation mode advantageously depends on the operating mode of the system, i.e. whether it is operating in SOFC or SOEC mode.

In addition, during operation, it can be envisaged operating only one of the heating elements, in particular in the case of a system having a thermally insulating enclosure in which the electrochemical device is isolated, as will be described below in relation to FIG. 8. For example, in the case of an operation of the system for producing hydrogen (SOEC), the operation being endothermic, an addition of heat is in general provided throughout the operation of the system, this being provided in stationary operation by the heating element integrated in the bottom clamping plate.

In the case of operation of a system for producing electricity for which the operation is exothermic, provision may be made for powering the heating wires of the two clamping plates in order to reach the operating temperature and next providing continuous heating in the bottom clamping plate only for heating the gases.

In the case of a very effective thermally insulated enclosure, it may be envisaged, in stationary or stable operation, to interrupt the provision of heat by the heating elements.

Figure 5:
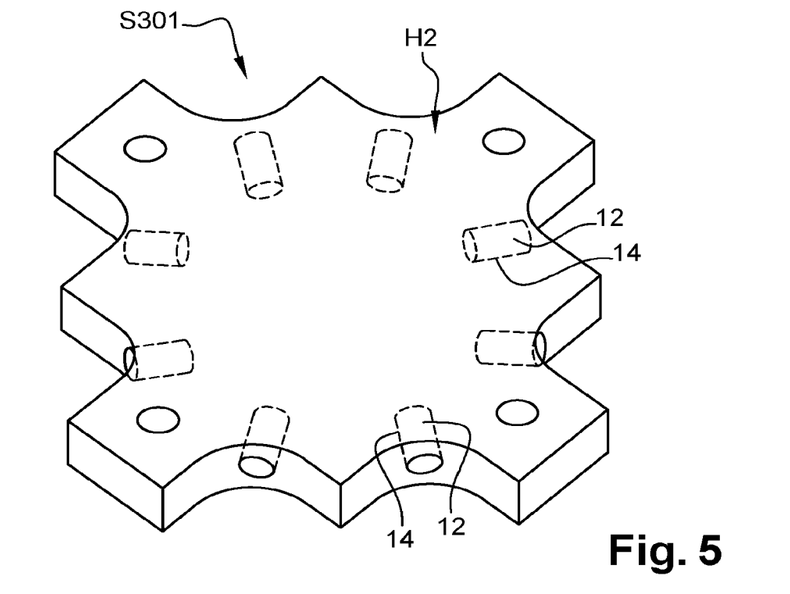
FIG. 5 is a perspective view of a clamping plate according to another example embodiment that can be used in the system of FIG. 2.

In FIG. 5, another example embodiment can be seen of a clamping plate S302 shown schematically provided with heating means H2. The heating means H2 include electrically conductive elements in the form of fingers or pins 12, which are inserted laterally in the clamping plates as is. The plates include, in the lateral edges thereof, housings 14, for example non-through bores wherein heat-dissipating electrically conductive elements are mounted. Preferably, the pins or fingers are distributed uniformly throughout the periphery of the plates. Preferably, the fingers are forcibly mounted in the housings 14 in order to provide good thermal contact between the fingers and the plate and to reduce heat losses. In a variant, in particular in the top heating plate, it may be envisaged disposing at least some of the fingers perpendicularly to the mid-plane of the clamping plate.

The electrochemical device includes a second clamping plate identical to the clamping plate S301. A differentiated management of the two clamping plates is then possible.

The mid-plane of the clamping plate is the plane to which the faces with the largest surface area of the clamping plate are substantially parallel.

Preferably, in FIG. 5 all the heating fingers or pins being distributed regularly in the clamping plane S301, the heating fingers or pins are preferably controlled to generate the same quantity of heat in order to ensure uniform heating throughout the cross section of the clamping plate.

In the case of a non-uniform distribution of the fingers or pins, then a differentiated management of the various pins can be envisaged.

Figure 6:
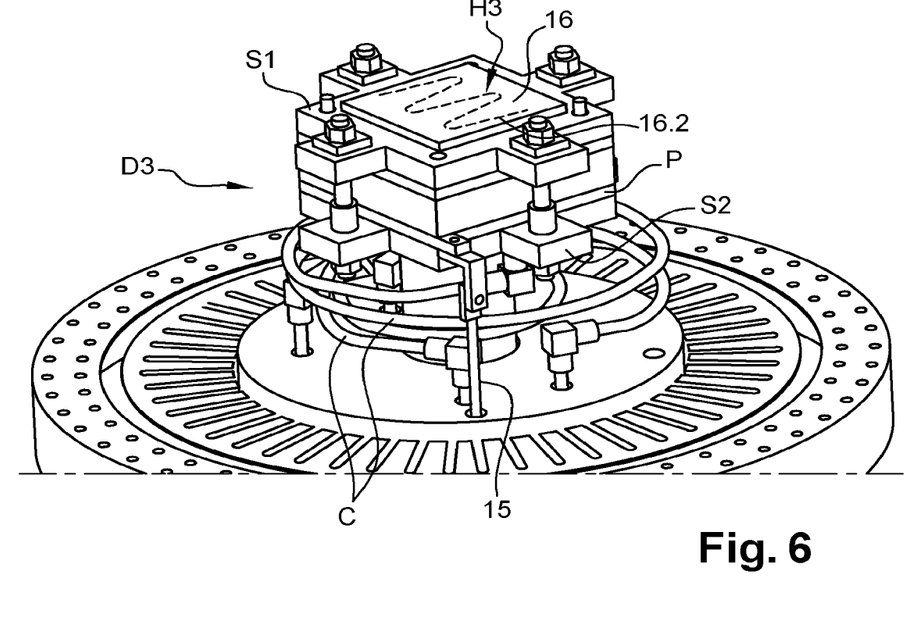
FIG. 6 is a perspective view of an electrochemical system according to another example embodiment, which can be controlled by a thermal regulation method according to the invention.

In FIG. 6, another advantageous example embodiment of the electrochemical device D3 can be seen, wherein the heating means H3 are attached to the clamping plates outside of such. The heating means include at least one heating plate 16 shown alone in FIGS. 7A to 7C. The heating elements thus disposed make it possible to control the thermal gradient throughout the height of the stack.

Figure 7A:
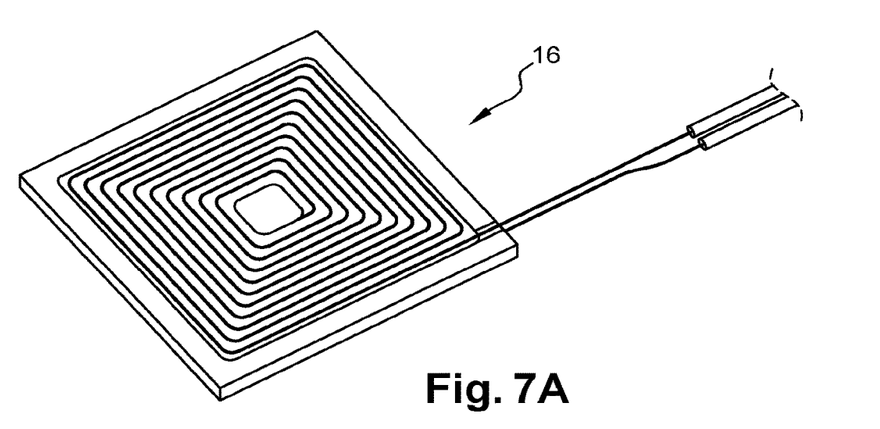
FIGS. 7A to 7C are various schematic representations of the heating means of the system of FIG. 6.
Figure 7B:
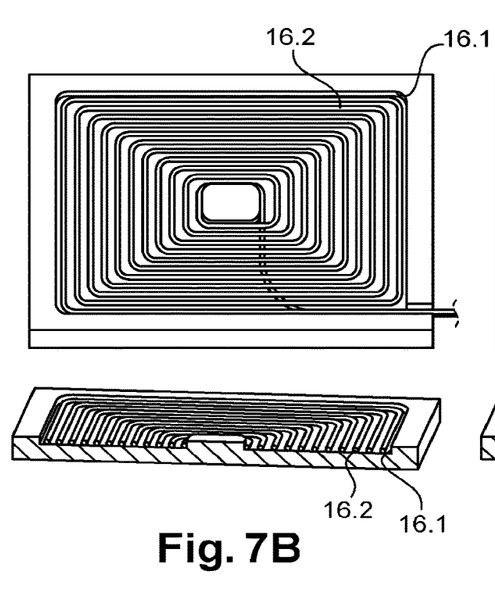
Figure 7C:
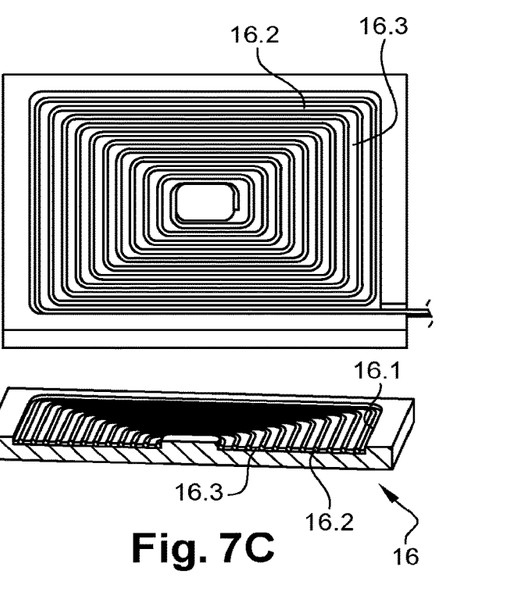

The heating plate 16 is for example manufactured in accordance with the same method as the clamping plates in FIGS. 2, 3A and 3B. The heating plate 16 includes a recess 16.1 formed in one of the faces thereof with the largest main surfaces and an electrical cable 16.2 shown in broken lines disposed in the recess 16.1 and solder 16.3 is deposited in the recess 16.1 on the cable in order to immobilise the lead in the recess. In FIG. 7B, the solder is not yet deposited.

The plate 16 thus formed can then be mounted in direct contact against the face with the most external surface of a clamping plate S1. Preferably, in order to ensure very good heat transfer between the heating plate 16 and the clamping plate S2, the faces in contact have very good flatness. For example, the heating plate is put in contact with the clamping plate so as to be able to be easily removable, i.e. without being definitively fixed thereto, while benefiting from the heating means integrated in the stack. In a variant, a layer of ductile material offering good thermal conductivity, for example a gold paste, is interposed between the clamping plate and the heating plate, which improves the thermal contact between the heating plate and the clamping plate, and compensates for any defects in flatness.

In a variant, the heating plate includes heating fingers or pins as in the example shown in FIG. 5. The fingers or pins may be mounted in the lateral edges and/or through the external main face of the heating plate.

The use of one or more heating plates 16 attached to the clamping plates makes it possible to equip electrochemical devices that are already manufactured and for which removing the clamping plates, either to replace them with clamping plates with integrated heating, or to introduce intermediate heating plates, is not possible.

In FIG. 6, the gas supply pipes and gas collection pipes C and the cable 15 for electrical connection to an end plate T can be seen.

In a variant, the heating means may be integrated in the stack in the form of plates attached in the stack. For example, the heating means include intermediate plates wherein a heating cable is integrated, these plates are disposed between a clamping plate and an end plate.

According to another variant, the intermediate plates are each disposed between two elementary electrochemical cells. Inserting intermediate heating plates makes it possible to reduce the vertical thermal gradients in the stack. In this variant, either the intermediate plates replace interconnectors, or external electrical connection means provide the electrical connection between the cells.

One or more safety and/or regulation temperature sensors may advantageously be disposed in the heating plates.

Thermocouples are advantageously disposed in the heating plate or plates 16 or in the intermediate plate or plates.

According to the electrochemical device produced, if the latter does not require the application of a clamping force in the direction of the stack, the clamping plates may be omitted.

It will be understood that the various examples in FIGS. 1 to 6 may be combined. For example, the heating means may include one or more conductors in only one clamping plate or in an intermediate plate. Or again the heating means include a heating plate 16 and a clamping plate with the heating conductors integrated.

Preferably, the electrochemical device is disposed in an enclosure so as to reduce the energy losses, in particular thermal, and to optimise the operation of the device. For example, the walls of the enclosure include one or more fibrous insulating materials comprising $SiO_2$, CaO and MgO or one of the materials of the light concrete type.

Figure 8:
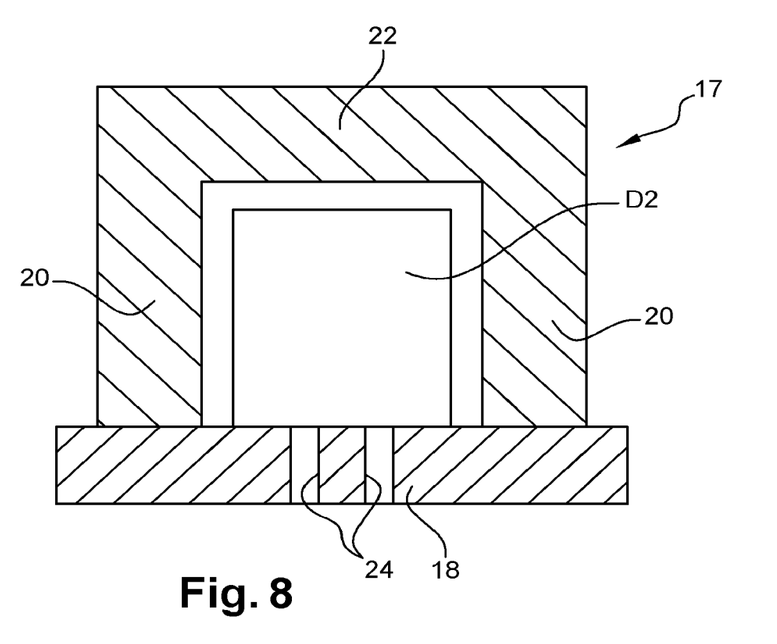
FIG. 8 is a schematic representation of an electrochemical installation using a system according to the invention.

In FIG. 8, a schematic representation can be seen of an installation comprising an electrochemical device according to the invention, for example the device D2, disposed in an enclosure 17, the enclosure being shown in cross section.

The enclosure includes a hearth 18 on which the electrochemical device is disposed, side walls 20 and a top wall 22 defining a closed volume thermally insulating the electrochemical device from the outside environment.

The enclosure, in particular the side walls 20 and the top wall 22, may be produced in a single piece or in a plurality of parts assembled with each other. Openings 24 are provided in the enclosure for tubes and electrical connectors to pass. The clearances between the contours of the openings and the tubes and the connectors are advantageously filled in with a thermally insulating material. Highly advantageously, the fluid connections and the electrical connections are made through the hearth 18, further reducing thermal leakages.

Preferably, the internal contour of the enclosure conforms to the external form of the electrochemical device and delimits, with the external surface of the device, a small clearance. This enables the internal wall of the enclosure to more effectively reflect the heat emitted by the electrochemical device in the direction of said assembly, and consequently makes it possible to use heating means of reduced power compared with those traditionally used in this type of application.

Moreover, combining integrated electrical heating means and an electrically insulating enclosure also helps to reduce the thermal gradients in the direction of the stack, and to allow homogenisation of the temperature within the electrochemical device, and thus to improve the efficiency of the latter.

This homogenisation of the temperature makes it possible to apply a set heating value to the integrated external conductors close to the heating temperature required for the stack. Thus the risks of damage to the elements of the device by overheating, in particular elements in the top part of the stack, are limited.

A reflective material on the internal wall of the enclosure could be provided.

A free space is preferably maintained between the electrochemical device and the internal wall of the enclosure to allow detection of any leakage on the stack. In general, air flushes the enclosure to dilute and discharge any leakages of hydrogen from the stack. Furthermore, it is preferable to avoid any contact between the enclosure and the stack in order to reduce the risk of short-circuit.

One or more sensors may be carried by the enclosure or disposed in the space between the enclosure and the electrochemical device, it may be a case of a temperature sensor for regulating the temperature of the device, a gas sensor for detecting a leak in the device, etc.

The electrochemical device according to the invention has the advantage of being very compact as it does not require to be disposed in an oven. Furthermore, it is very easy to use since it can easily be connected to the four gas supply and collection pipes and to electrical supplies for the integrated heating system and the end plates. This device is then of the "plug and play" type.

In the case where the device is housed in an enclosure, the latter is advantageously of small size since it is formed to the shape of the device, which can easily be achieved. The enclosure may be assembled around the device, unlike an oven, which includes electrical elements on its internal walls. In addition, the walls are of reduced thickness since they do not include any electrical elements.

The description of the differentiated management of the heating elements of a system without enclosure applies to the differentiated management of the heating elements of a system with enclosure.

In the examples in FIGS. 2, 5 and 6, the heating elements are disposed in the clamping plates. In a variant, in addition to the heating elements in the clamping plates, one or more heating elements are disposed between the electrochemical cells to allow even finer management of the temperature in the stack. In selecting the number of heating elements, account is taken of the additional thickness involved, the electrical consumption that results therefrom, and potential sources of failure.

In the examples of systems described, the heating elements are electrical elements. Using heating elements of the Joule effect type has the advantage of affording easy control of the thermal energy generated. Other heating means may be envisaged, such as for example heating by means of the circulation of a gas. Nevertheless, this type of heating has less good reactivity than electrical means.

The heating elements may have different powers and different capacities to generate heat. For example, in a stack including clamping plates with heating elements and intermediate heating plates, it may be envisaged for the heating elements in the intermediate plates to have different powers compatible with the requirements.

In the examples of regulation described, it is sought to reduce the thermal gradient or even to cancel it. Nevertheless, it may be envisaged imposing commands on the heating elements so as to create a thermal gradient in the stack. A regulation method making it possible to establish such a gradient does not depart from the scope of the present application. For example, such regulation may be used when one of the ends of the stack works better or less well than the other, and the temperature of this end may then be reduced or increased respectively in order to make the performances of the cells of the stack uniform.

The invention claimed is:

1. A method for thermal regulation of an electrochemical system comprising a stack of n electrochemical cells, n being an integer greater than or equal to 2, the electrochemical cells being solid-oxide electrolyser cells or solid-oxide fuel cells, and at least n−1 interconnection plates interposed between the electrochemical cells, at least one gas supplier for supplying gas to the electrochemical cells and at least one gas collector for collecting gases produced by the electrochemical cells, and at least one electric connector for electrically connecting the system to the outside, wherein the electrochemical system also includes at least one heater integrated in the stack, said at least one heater including at least a first and a second heating element, said first and second heating elements being electrical, the first heating element being disposed in a first location in the stack and the second heating element being disposed in a second location in the stack, including:
   applying a first command to the first heating element and a second command to the second heating element, said first and second commands being determined so as to maintain a thermal gradient, with regard to the heat supplied by the first and second heating elements, in the stack in a direction of the stack substantially at a given value, and
   obtaining a differentiated regulation of the heating elements by managing an intensity of electric currents supplying each heating element by applying different amounts of heat according to one of reduced operating performance and thermal leakage of the electrochemical cells.

2. The regulation method according to claim 1, wherein the first and second electrical heating elements are Joule effect type elements.

3. The regulation method according to claim 1, wherein the first and second commands vary during operation of the system.

4. The regulation method according to claim 1, wherein the first location is situated at one end of the stack through which pipes supplying gas to the cells enter, the gases being at a temperature lower than an operating temperature of the system, and wherein the first command is such that the first element generates a higher quantity of heat than the second element for compensating for a drop in temperature due to the gas supply and to maintain the thermal gradient substantially at the given value.

5. The regulation method according to claim 1, wherein determining the first command takes into account one of a temperature or temperatures of feed gases and flow rates of the feed gases.

6. The regulation method according to claim 1, wherein at least in a start-up phase of the system the first and second commands are such that the first and second heating elements are at the same temperature, until the system reaches an operating temperature.

7. The regulation method according to claim 1, wherein at least one of the first and the second commands is one of determined and modified according to a measurement of operating characteristics of the system.

8. The regulation method according to claim 7, including:
   measuring temperatures in at least two distinct regions of the stack,
   comparing a difference in the temperatures of the two regions with respect to a threshold value, and
   one of determining and modifying at least one of the first command and the second command based upon the comparing.

9. An electrochemical system, comprising:
   at least one electrochemical device comprising a stack of n electrochemical cells, the electrochemical cells being solid-oxide electrolyser cells or solid-oxide fuel cells, n being an integer greater than or equal to 2,
   at least n−1 interconnection plates interposed between the electrochemical cells,
   at least one gas supplier for supplying gas to the electrochemical cells,
   at least one gas collector for collecting gases produced by the electrochemical cells, and
   at least one electric connector for electrically connecting the system to the outside, wherein
   the electrochemical device includes at least one heater integrated in the stack, said at least one heater including at least a first and a second heating element, said heating elements being electrical, the first heating element being disposed in a first location in the stack and the second heating element being disposed in a second location in the stack, and
   the system includes a controller configured to separately control the first heating element and the second heating element so as to afford a different addition of heat between the first location and the second location and to maintain a thermal gradient, with regard to the heat supplied by the first and second heating elements, in the stack in a direction of the stack substantially at a given value, a differentiated regulation of the heating elements being obtained by managing an intensity of electric currents supplying each heating element by applying different amounts of heat according to one of reduced operating performance and thermal leakage of the electrochemical cells.

10. The electrochemical system according to claim 9, wherein the first and second electrical heating elements are Joule effect type elements.

11. The electrochemical system according to claim 9, wherein the controller is configured to control the heating elements in a mode predetermined during design of the electrochemical system.

12. The electrochemical system according to claim 9, including at least one sensor measuring a temperature in at least first and second distinct regions of the stack, and wherein the controller is configured to control the heating elements so as to reduce the thermal gradient in the direction of the stack.

13. The electrochemical system according to claim 9, wherein the first and second heating elements are each disposed in a heating plate disposed one of in the stack and on the stack.

14. The electrochemical system according to claim 13, wherein the heating plates are each disposed at an end of the stack in the direction of the stack.

15. The electrochemical system according to claim 14, comprising:
two clamping plates each disposed at an end of the stack in the direction of the stack, and
a clamping device cooperating with the plates to apply a clamping force to the n cells and n−1 interconnections, and wherein each heating plate is formed by a clamping plate.

16. The electrochemical system according to claim 14, comprising:
two clamping plates each disposed at an end of the stack in the direction of the stack, and
a clamping device cooperating with the plates to apply a clamping force to the n cells and n−1 interconnections, and wherein each heating plate is in abutment against a clamping plate.

17. The electrochemical system according to claim 16, wherein each heating plate is in abutment against an external face of the clamping plate.

18. The electrochemical system according to claim 9, comprising:
two clamping plates, each disposed at an end of the stack in the direction of the stack, and
a clamping device cooperating with the plates to apply a clamping force to the n cells and n−1 interconnections.

19. The electrochemical system according to claim 9, including a thermally insulating enclosure defining an internal space receiving the at least one electrochemical device and insulating the at least one electrochemical device thermally from the outside.

20. The regulation method according to claim 1, comprising:
supplying currents to each of the first and second heating elements to supply beat to the stack from each of the first and second heating elements.

21. The regulation method according to claim 1, comprising:
obtaining the differentiated regulation of the heating elements by managing the intensity of electric currents supplying each heating element by applying different amounts of heat according to reduced operating performance of the electrochemical cells.

* * * * *